(12) United States Patent
Colson et al.

(10) Patent No.: US 10,074,128 B2
(45) Date of Patent: Sep. 11, 2018

(54) PRE-PURCHASE MECHANISM FOR AUTONOMOUS VEHICLES

(71) Applicants: Shay C. Colson, Bellingham, WA (US); David A. Divine, Spokane, WA (US)

(72) Inventors: Shay C. Colson, Bellingham, WA (US); David A. Divine, Spokane, WA (US)

( * ) Notice: Subject to any disclaimer, the term of this patent is extended or adjusted under 35 U.S.C. 154(b) by 507 days.

(21) Appl. No.: 14/733,347

(22) Filed: Jun. 8, 2015

(65) Prior Publication Data
US 2015/0356665 A1    Dec. 10, 2015

Related U.S. Application Data

(60) Provisional application No. 62/009,326, filed on Jun. 8, 2014.

(51) Int. Cl.
| | | |
|---|---|---|
| *G06Q 30/00* | (2012.01) | |
| *G06Q 30/06* | (2012.01) | |
| *G01C 21/36* | (2006.01) | |

(52) U.S. Cl.
CPC ..... *G06Q 30/0635* (2013.01); *G01C 21/3697* (2013.01)

(58) Field of Classification Search
CPC ............ G06Q 30/0635; G01C 21/3697; B61L 2210/02; G05D 1/021
USPC .......................... 705/26.1, 27.1, 26.7, 26.81
See application file for complete search history.

(56) References Cited

U.S. PATENT DOCUMENTS

| | | | |
|---|---|---|---|
| 2013/0085817 A1* | 4/2013 | Pinkus | G06Q 30/0207 705/14.1 |
| 2013/0231824 A1* | 9/2013 | Wilson | G05D 1/0246 701/26 |
| 2014/0257988 A1* | 9/2014 | Prakah-Asante | G01C 21/3484 705/14.63 |

(Continued)

FOREIGN PATENT DOCUMENTS

KR    101721210 B1 *  3/2017  ............. G06F 17/50

OTHER PUBLICATIONS

Moreno, A.; Angulo, I.; Perallos, A.; Landaluce, H.; Zuazola, I.J.G.; Azpilicueta, L.; Astrain, J.J.; Falcone, F.; Villadangos, J. Ivan: Intelligent Van for the Distribution of Pharmaceutical Drugs. Sensors 2012, 12, 6587-6609. (Year: 2012).*

*Primary Examiner* — Marissa Thein
*Assistant Examiner* — Michelle T Kringen (57) ABSTRACT

An onboard computing device of autonomous vehicle interacts with computers utilized by one or more merchants to enable users to pre-purchase items from the one or more merchants while en route to a destination. Merchant computing devices may employ dynamic promotions to incent the user to prep-purchase items and to reroute to a destination of the respective merchant. Once a user pre-purchases an item from a merchant, the merchant may prepare the item for the user's arrival by, for example, prepackaging the item, or manufacturing or assembling the item, while the customer is en route (i.e., before the user's autonomous vehicle arrives at the destination). The merchant computing device may send a pre-purchase confirmation to the onboard computing device of the user, which may indicate where the user's autonomous vehicle should park and/or where the pre-purchased items are being held for pick up.

20 Claims, 6 Drawing Sheets

(56) References Cited

U.S. PATENT DOCUMENTS

| | | | |
|---|---|---|---|
| 2014/0380424 A1* | 12/2014 | Thompson | G06F 21/31 726/4 |
| 2015/0126224 A1* | 5/2015 | Takatsuji | G01C 21/20 455/456.3 |
| 2015/0234636 A1* | 8/2015 | Barnes, Jr. | G06F 3/167 715/728 |

* cited by examiner

PRE-PURCHASE MECHANISM FOR AUTONOMOUS VEHICLES

This application claims the benefit of priority to U.S. Provisional Application No. 62/009,326, filed Jun. 8, 2014, which is incorporated herein by reference.

BACKGROUND

Today, consumers spend large amounts of time preparing to go shopping. They take time creating shopping lists. They take time driving to multiple locations to purchase the items on the lists. Once they arrive at a store they take time parking and walking around the store looking for the items on their lists. They wait in checkout lines at the stores, and then they take time actually purchasing the items. Often consumers can't locate the items on their lists at one store, requiring them to drive around to multiple stores to find the items. The complexity and time involved in shopping increases dramatically if a consumer attempts to take into account sales or promotions at various different stores to purchase items at the lowest prices. Thus, the process of shopping today wastes copious amounts of time, fuel, and energy.

BRIEF DESCRIPTION OF DRAWINGS

The detailed description references the accompanying figures. In the figures, the left-most digit(s) of a reference number identifies the figure in which the reference number first appears. The use of the same reference numbers in different figures indicates similar or identical items.

DETAILED DESCRIPTION

Autonomous vehicles create time and space for human interaction that has not previously been possible, as someone has always been tasked with driving the vehicle. As used herein, an autonomous vehicle is one that is capable of conveying itself from a current location to a destination without requiring a user to drive the vehicle. The ability for networked communication with on-board computers in vehicles to interact with computers used by merchants will allow for a new level of interactions currently not possible.

For example, destination and/or route information will enable many autonomous vehicle experiences. Autonomous vehicles may be capable of doing a number of things with this information that power enhancements to travel, commerce, entertainment, and/or productivity.

As autonomous vehicles become increasingly available to consumers on a wide-scale, a new level of commerce interactivity will become accessible during our autonomous transit time. The mechanisms contained in this application allow consumers to pre-order items on their way to the store, much like going through your grocery list before you leave. Examples may also allow users to modify previously placed orders in transit. This application also describes an example platform to incentivize consumers to purchase items based on previous buying history, merchant requirements, and/or other dynamic factors.

This application describes, among other things:

The capability for on-board computers of autonomous vehicles to interact with computers utilized by the destination merchant.

Interaction mechanisms and user-interfaces for pre-purchasing items located at the destination of an in-bound autonomous vehicle.

A mechanism for dynamic retail discounts controlled automatically based on one or more preset rules or in substantially real time by the merchant, and based on a broad range of merchant requirements (e.g., time-based discounts, dynamic discount amounts/percentages based upon merchant's stock levels of particular items, customer purchase history or preferences, or other factors).

Data and communication techniques and schemas that facilitate in-transit commerce to the benefit of both the consumer and the merchant. For example, the techniques and schemas described herein may allow consumers to verify availability and price of desired items prior to arriving at a store, and/or allow merchants to gain an increased understanding of traffic in and demand for their particular location or wares.

Example Buy Now Mechanism

Figure 1:
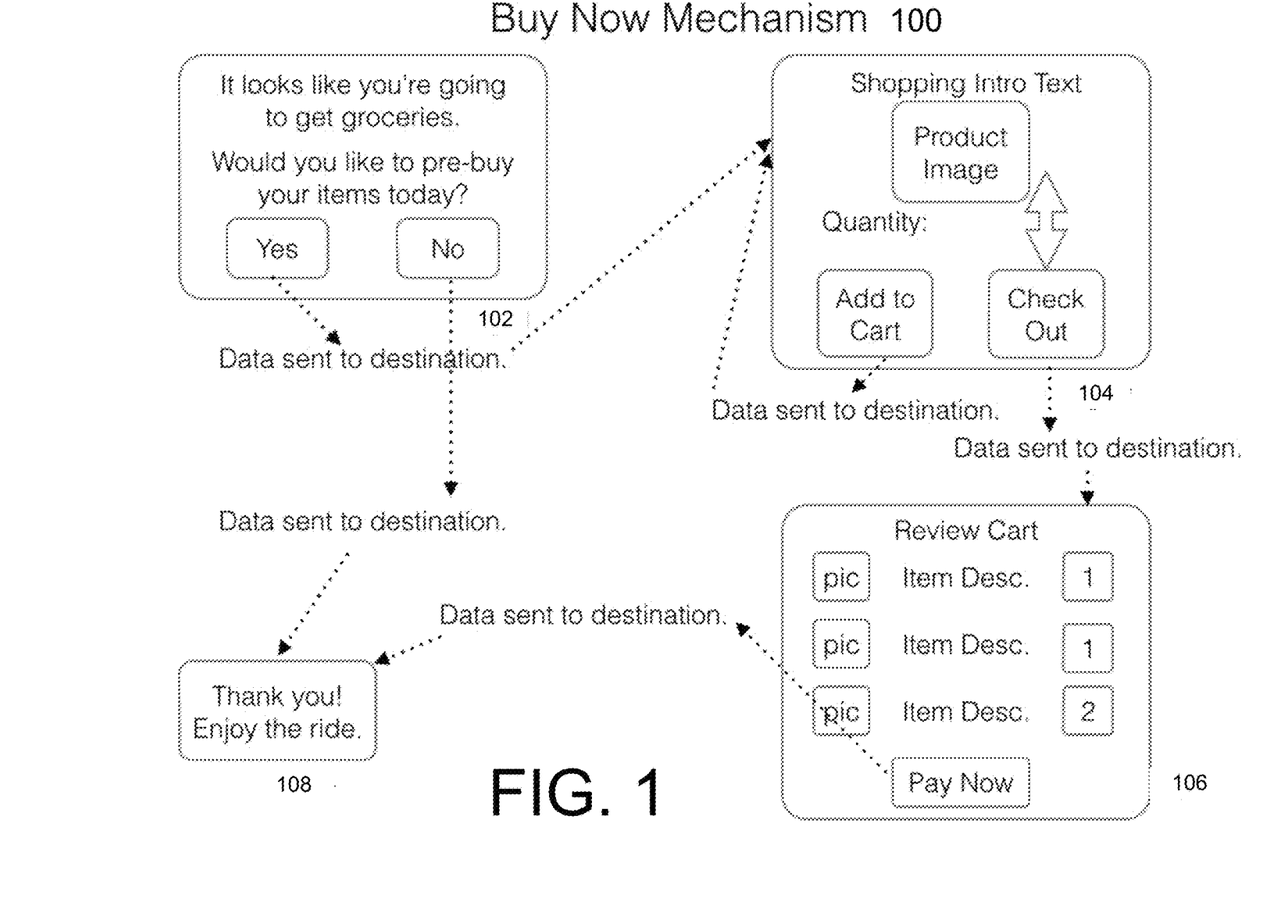
FIG. 1 is a block diagram illustrating an example use scenario in which a user is enable to pre-purchase one or more items while en route to a merchant.

FIG. 1 illustrates an example buy now mechanism 100, which allows shoppers to pre-purchase items from a merchant while en route to the merchant's physical location or another destination. The buy now mechanism 100 includes, at block 102, an example message that may be displayed on a display of or in communication with an onboard computing device of an autonomous vehicle. By way of example and not limitation, the display may be disposed in a dashboard or console of the autonomous vehicle, may be a head-up display (e.g., projected on a windshield or other window of the autonomous vehicle) and/or on a display of a user's mobile device (phone, tablet, etc.). In the latter case, the mobile device may be in communication with a computer system of the autonomous vehicle. For instance, the mobile device may provide an interface for interacting with the autonomous vehicle. Additionally or alternatively, the mobile device and the onboard computing device may each perform part of the buy now mechanism 100. For instance, the mobile device may communicate with the autonomous vehicle computing system to share destination or route information, to share purchase information (e.g., purchase history, payment credentials, authentication credentials, or the like), to share promotional offers, to share shopping lists stored in memory of or accessible by one of the devices, or the like.

In some examples, the display may be responsive to touch inputs. The example message may be part of a set of interactive dialogues that allow the user to navigate one or more menus to initiate, modify, and/or complete transactions while they are en route to a pre-determined destination (i.e., before they reach the destination). By way of example and not limitation, the term "transaction" includes purchases, sales, orders, rentals, leases, reservations, returns. Transactions may involve physical or electronic (e.g., digital) items and/or services. Transactions may, but need not necessarily, involve transfer of money or other resources from one entity (e.g., customer) to another (e.g., merchant) in exchange for goods and/or services.

In one example, a user may get in a vehicle and indicate a desired destination (e.g., by voice command, touch entry, text entry, etc.) via the onboard computing device. The destination may comprise a particular store or merchant, an address, a coordinate location, a geographic area (e.g., downtown, Seattle, within five miles), or a contextual destination (e.g., closest store having a particular item, or store having a specified item at a lowest price, or store having a specified list of items at a lowest total price for all items). The onboard computing device may then communicate with one or more computing devices of the desired destination (e.g., destination computing device(s)) to obtain information about one or more items available for purchase at the destination. In the case of a contextual destination, the onboard computing device may query multiple potential destination computing devices and/or may perform a search of the internet or other information sources to identify one or more physical destinations. The onboard computing device may then select a physical destination based on responses received from the multiple potential destination computing devices and/or search results. Additionally or alternatively, in some examples, the onboard computing device may take into account user preferences regarding particular merchants, brands, geographical areas, and/or routes when selecting the physical destination. Additionally or alternatively, the onboard computing device may prompt the user which of multiple potential destinations they would prefer. The onboard computing device may then communicate with the computing device(s) of the determined/selected physical destination.

The onboard computing device may additionally or alternatively obtain previous user input information about one or more items the user desires to purchase (e.g., from one or more shopping lists stored at or accessible to the onboard computing device, one or more online shopping or wish lists, one or more reminders, etc.). The onboard computing device may additionally or alternatively communicate with one or more smart appliances (e.g., a refrigerator, dishwasher, washing machine, coffee maker, etc.) and/or sensors (e.g., camera or other sensor located in a pantry of the user's home) to obtain inventory information regarding items that the user is out of, running low on, are expired, are getting stale, or the like. The onboard computing device may or may not provide the information about item(s) the user desires to purchase, the inventory information, or both to the destination computing device(s).

The computing device(s) of the desired destination may serve content for presentation by the computing device in the vehicle, which includes a pre-buy interface 102. In some examples, the content served by the destination computing device(s) may be customized for the user based on the prior user input and/or inventory information. In other examples, the content served by the destination computing device(s) may be generic and may be customized for the user by the onboard computing device. In either case, the pre-buy interface 102 may include one or more items available for purchase based on a number of factors, including but not limited to, the previous user input, the inventory information, a user's purchase history (e.g., from a destination merchant, other merchants, online merchants, etc.), contextual information (e.g., day of the week, time of day, location, etc.), and/or most popular items at the destination location, for example. In some examples, the interface may include a page with information (e.g., pictures, video, and/or description) about the item(s), an advertisement for the item(s), price information for the item(s), quantity of the item(s) remaining at the merchant, and/or a purchase interface by which the user can complete a purchase of the item(s).

Should a user's selection affirm their desire to pre-purchase items (represented in FIG. 1 by the 'Yes' icon, though representations could be made through different wording, imagery, coloring, etc., or set to automatically confirm in advance), the onboard computing device may initiate communication with the destination computing device(s) in use by the destination merchant or hosted by a cloud or web service on the merchant's behalf. Examples of the communication between the onboard computing device and the destination computing device(s) is described in more detail in the Merchant Server section of this document.

Should a user's selection indicate their desire to decline a pre-purchase item, the onboard computing device may initiate communication with the destination computing device(s) to indicate the user's desire. In some examples, by capturing, transmitting, and cataloging the fact that the user declined to employ this pre-purchase option, the destination computing device(s) and/or onboard computing device may be able to optimize the items displayed to the user in the future for better performance (e.g., to present items that are more likely to be of interest to the user). These usage patterns can inform changes to when and how the pre-buy interface is displayed, including but not limited to changing the time during the ride at which the message is displayed (closer to the destination, closer to the departure location, at a predetermined time away from the destination, etc.), how the message is displayed (including changes in the wording, changes in the placement of the iconography, inclusion or exclusion of images, audio components, etc.), and/or nature of pre-buy offer to entice the user to pre-purchase the item (e.g., an amount or percentage of discount offered, a type of discount—sale price vs. buy-one-get-one vs. quantity discount, etc.).

In some examples, the interface may display items that have recently been purchased (online or using the pre-purchase mechanism described above). In such examples, the user may be presented with an interface usable to modify the previous purchases. In some examples, one or more promotions relating to the previous purchases may be displayed (e.g., offering the user to buy additional quantities of the item at a discount, offering the user a discount on related or competing items, rebates associated with the items, etc.).

At block 104, FIG. 1 illustrates an interactive interface that allows the user to confirm both the selection of a displayed item and a quantity of the item for purchase. This message dialogue may be displayed on the display of or in communication with the onboard computing device.

At 106, FIG. 1 illustrates a summary interface containing each of the items the user has selected by completing the previous dialogue screens. This summary may be displayed on the display of or in communication with the onboard computing device, and may allow for changes to be made in both the quantity of selected items and for confirmation of an order prior to submission of the order.

At 108, FIG. 1 illustrates an acknowledgement message confirming an order has been placed. This message may be displayed on the display of or in communication with the onboard computing device. In some examples, this confirmation interface may be stored by the onboard computing device (or the user's mobile device) as a receipt showing proof of the pre-purchase. In some examples, this receipt may be presented at the desired destination in order pick up the pre-purchased items. For instance, the confirmation may be presented by visually showing the confirmation to a merchant employee on a display of the onboard computing device or mobile device, by electronically presenting the confirmation to a computing device or point of sale device at the merchant, or the like.

Example Onboard Computing Device

The term "onboard computing device" refers to any physical devices that are integrated with or carried on or within the vehicle, that may be part of the vehicle's dashboard, part of the vehicles navigation or communications system, or an independent mobile device that is carried by the consumer (e.g., smartphone or tablet). These devices may provide discrete input to the system such as location, destination, social network information, purchase history, payment instruments, bank balances, membership in retail loyalty programs, various user input mechanisms (e.g., touch input, voice input, biometric information, keypads, dials, knobs, cameras, or the like), etc. These devices may also provide computing capacity to correlate contextual information, such as communicating with other devices including but not limited to "smart home" appliances like refrigerators or merchant servers, as described in the following section.

Figure 2:
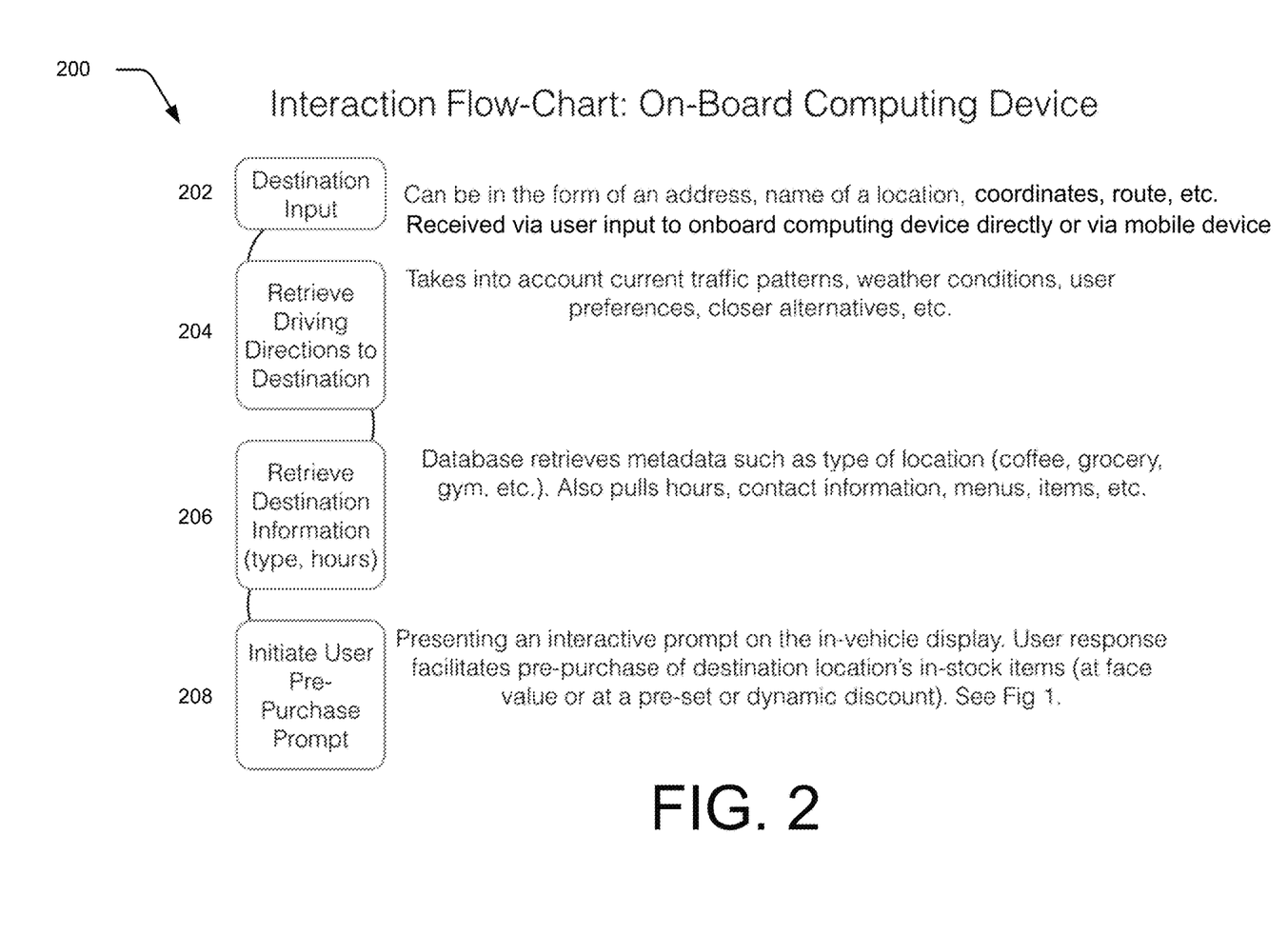
FIG. 2 is a flowchart illustrating an example flow of operations implemented by an onboard computing device of an autonomous vehicle to facilitate the pre-purchase scenario of FIG. 1.

FIG. 2 illustrates an example flow of operations 200 implemented at least in part by an onboard computing device of an autonomous vehicle. As shown in FIG. 2, at block 202, the onboard computing device receives input of a destination. As noted above, the destination may be provided as text input, voice input, selection of a destination from a list, selection of a destination on a map, or any other input mode described herein. In some examples, the input may be received via a touch screen, keyboard, microphone, wireless connection (e.g., via a mobile device of the user), or the like. The destination may be received in the form of an address, a name of a location, coordinates, a route, or a contextual destination as described above.

At block 204, the onboard computing device takes into account conditions, such as current traffic patterns, weather conditions, user preferences, alternative destinations (e.g., closer locations, locations with shorter travel times, less expensive locations, locations with which the user is a member of a loyalty program, etc.). The onboard computing device may then calculate or otherwise obtain a route to the destination.

At block 206, the onboard computing device retrieves metadata such as type of location (e.g., coffee shop, grocery store, restaurant, gym, etc.), hours, contact information, menus, catalog of items available for purchase, or the like. The metadata may be obtained directly from a website or computing device associated with the destination, or from third party service such as a search engine, rating service, or the like.

At block 208, the onboard computing device assembles presents a graphical user interface including one or more prompts, such as those shown in FIG. 1, on the display screen (or audibly via a speaker or other audio output). The prompt may be based on the received destination, the conditions, and/or the metadata. The onboard computing device may then receive responses to the one more prompts. In the event the responses received from the user indicate the user desires to pre-purchase one or more items available for purchase and in-stock from a merchant at the destination (at face value or at a pre-set or dynamic discount), the onboard computing device may communicate a pre-purchase request to one or more merchant computing devices.

Example Merchant Server Operations

Merchant servers or computing devices refer to physical or virtual servers or other computing devices that are owned, rented, or otherwise used on behalf of the merchant, retail location, business, or other desired destination. The merchant servers may be physically located at a location of the merchant, or may be remotely located, such as in the case of cloud or web-based services.

Figure 3:
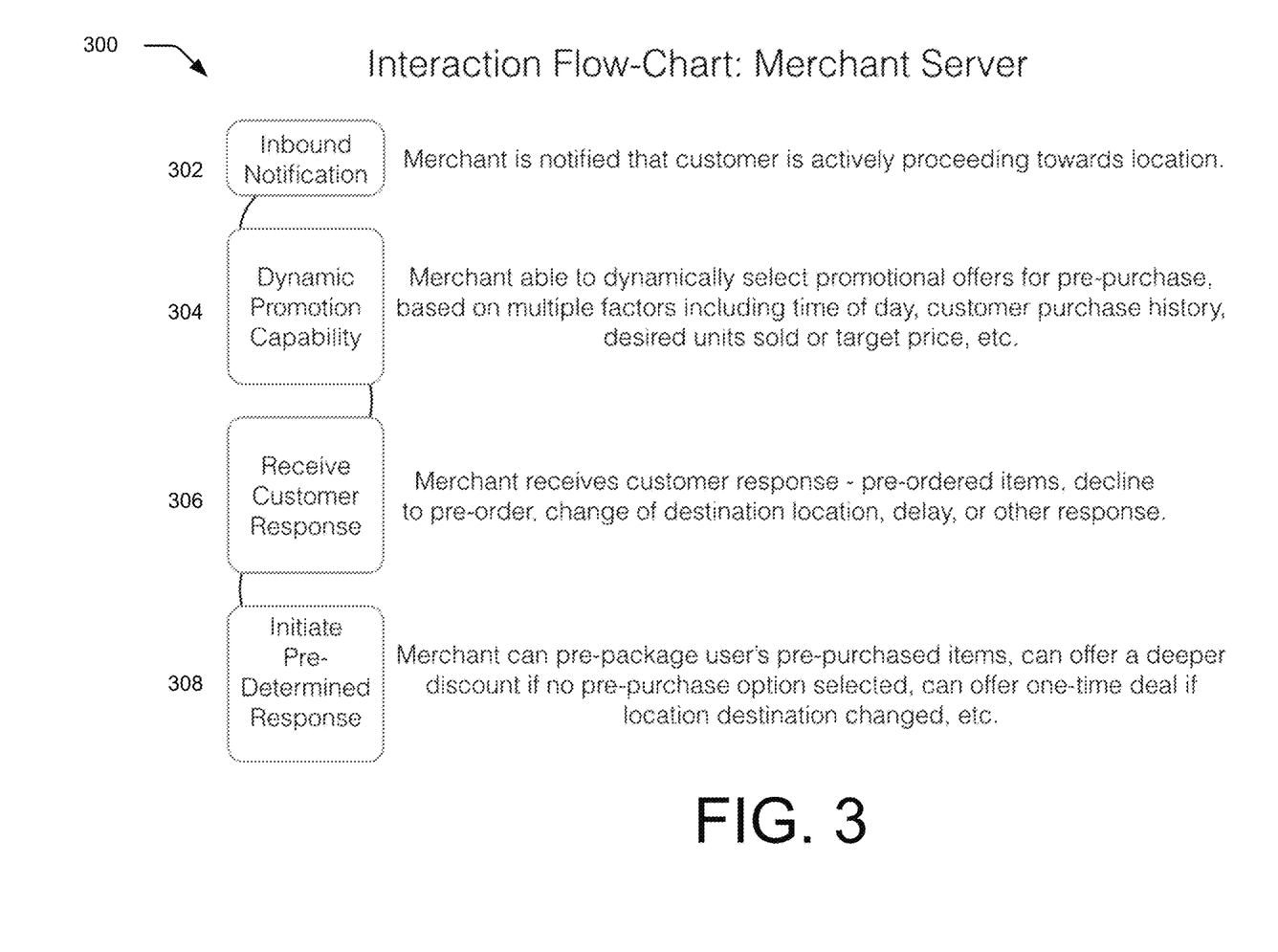
FIG. 3 is a flowchart illustrating an example flow of operations implemented by a merchant server to facilitate the pre-purchase scenario of FIG. 1.

FIG. 3 illustrates an example flow of operations 300 related to an inbound notification received by one or more merchant server(s). At block 302, a merchant server or computing device receives an inbound notification from an onboard computing device or other service (e.g., a location service, shopping service, etc.) indicating that an event relevant to the merchant. Inbound notifications can be determined and received by the merchant servers in multiple ways, including but not limited to, a mechanism that allows merchants to purchase travel data for a limited geography near their location (geofencing) to attempt to capture traffic that already exists in close proximity, a mechanism whereby navigation systems notify the merchant servers when the merchant location is input as a destination, a mechanism whereby merchants can receive notifications when a previous customer is within a given physical proximity to the merchant location, or some other mechanism.

In some examples, an apparatus to facilitate inbound notifications for merchant servers may focus on filtering traffic, including pedestrian, cycle, vehicle, and transit, near the merchant's physical location. By categorizing this traffic as being of the closest physical proximity, merchant servers may be able to offer increased discounts or time-based incentives because these customers are already near the store's location. For example, a merchant server of a barber shop receiving an inbound notification that a user is traveling within a predetermined proximity of the merchant's location at a time when the barber shop does not have any current appointments, may offer a significant discount to the user for a haircut. The discount may be time based and may expire if not used or accepted within a limited amount of time following the offer of the discount. As another example, if a merchant server of a grocery store receives an inbound notification that a user is shopping for produce and the grocery store has a large quantity of the produce with a limited shelf life, the grocery store may offer a discount to the user to purchase produce or a volume discount on purchase of at least a threshold amount of the produce.

In some examples, an apparatus to facilitate inbound notifications for merchant servers may source notifications from in-car navigation systems each time the merchant's location is entered as a destination, or each time the merchant's location shows up in search results based on a query input by a user. For example, if a user sets the merchant's location as their destination, the merchant servers would then be notified of this inbound customer and be able to engage the customer through the pre-purchase mechanisms described herein. In another example, if a competitor's location is entered as a destination, the merchant servers may be notified and the merchant may provide one or more incentives to entice the customer to change the destination to the merchant instead of the competitor. These incentives may be transmitted by the merchant servers and received by the onboard computing device for presentation on the display.

In some examples, inbound notifications for merchant servers may occur each time a previous customer enters a pre-set geographic location or proximity of a geographic location, as determined by the onboard computing device. For example, if the onboard computing device reports its location (or destination or route) to a web application or location service, the web application or location service may report the user's location (or destination or route) to the merchant server(s), which may engage the customer via the onboard computing device trough the interfaces described herein. In another example, if a previous customer's device indicates the user is within a radius of several blocks, the merchant server can then be notified of this previous customer's location and initiate engagement with the customer through the interfaces described herein. For instance, the merchant may engage the previous customer to invite them to purchase more of the item(s) they purchased on their last visit (e.g., "stop in for another vanilla late now" or "looks like you may be almost out of milk, stop in now to resupply").

Once engaged with a potential customer, at block 304, merchant servers may present promotional offers for customers who wish to pre-purchase items based on multiple factors, including but not limited to, temporal factors (e.g., date, time of day, season, holidays, etc.), environmental factors (e.g., traffic, weather, etc.), identified customer purchase history or frequency (e.g., frequent customers or customers who have not made a purchase for a threshold period of time are offered a larger discount), purchase history of customers similar to the identified customer regardless of whether the customer is a first time customer or returning customer, a desired number of units to be sold in a given period (hour, day, week, month) combined with the number already sold (whereby discounts can increase or decrease in proportion to the total number units sold vs. the goal number of units sold), shelf life or expiration of current inventory, a desired target price per unit (whereby discounts can increase or decrease in proportion to the desired target unit price), information gathered regarding similar items available at nearby merchants or merchants located along the customer's chosen route, a time-based promotion, whereby the offered discount is valid only for a short period of time (i.e., the next hour), or a set period of time (from 4 PM to 6 PM), etc.

In some examples, merchant servers dynamically offer lower promotional prices to customers for a variety of reasons, including but not limited to offering promotional prices on movie tickets during a rainy day, offering promotional prices on a cup of coffee in the afternoon to consumers who purchased a cup in the morning, offering promotional prices on the remaining items in a retailer's stock with a price dynamically lowering until the remaining stock is sold, or promotional prices on the remaining items in a retailer's stock with a price dynamically increasing as the quantity of items in-stock (at the merchant and/or nearby competitors) becomes more scarce.

In another example, information from a customer's social networking connections may be used to offer promotional pricing based on purchases made by other customers in their network—promoting a product that has recently been purchased by a certain number of connections, or by individuals in their social network with whom they have had recent contact.

At block 306, the merchant servers may receive a customer response from an onboard computing device of the user. The merchant's servers may determine the nature of the response and may take different actions depending on the nature of the response. For instance, the customer response may be determined to be an indication that the customer does not desire to pre-order items at this time; the response may identify the items and quantity of said items the customer has pre-purchased; the response may indicate whether or not the customer has changed their destination or added additional destinations before or after the merchant's retail location; the response may indicate whether the customer is experiencing a delay for reasons such as traffic, construction, or some other reason.

If a merchant server receives a response that the customer has declined to pre-purchase items, these negative responses may be cataloged and tracked, and future messages may be adapted or changed based on these negative responses. By capturing, transmitting, and cataloging the fact that the user declined to employ this pre-purchase option, retail locations may be able to optimize pre-purchase interfaces for better future performance in the form of more customers pre-purchasing items. This mechanism provides a way for indicated usage patterns to inform changes to the pre-purchase interface, including but not limited to changing the time during the ride in which the message is displayed (closer to the destination, closer to the departure location, at a predetermined time away from the destination, etc.), or how the message is displayed (including changes in the wording, changes in the placement of the iconography, inclusion or exclusion of images, audio components, etc.). The usage patterns may also indicate one or more biases or prejudices the user has toward the merchant. For instance, the user may have had a bad experience with the merchant or may disagree with a social or political stance taken by the merchant. The merchant may employ promotional incentives, marketing techniques, surveys, and/or direct customer service intervention (e.g., a phone call, email, text, etc.) to better understand or overcome these biases or prejudices.

The techniques described herein also enable merchants the ability to offer an increased discount in the event that a consumer declines a pre-purchase offer. This discount may be calculated dynamically based on a number of factors, including but not limited to, merchant tolerances on discounts and desired margins, customer purchase history, etc.

The foregoing operations have established whether a customer wishes to pre-purchase items, the items the consumer wishes to pre-purchase, how many of those items they would like, and the merchant server and user have agreed on a price or incentive model that is mutually amenable. At block 308, the merchant may take one or more actions in preparation for the user's arrival at the merchant. For example, the merchant may automatically pre-package a customer's pre-purchased items while the customer is en route to the retail location (i.e., before the user's autonomous vehicle arrives at the destination). In the case of groceries, prepackaging may comprise placing the groceries in one or more bags, boxes, or totes. In the case of an order from a restaurant for take out, the merchant may package the pre-purchased items in thermally insulated packages, spill proof packages, or the like. In the case of prescription medications, the prepackaging may comprise placing the prescription medication in a bottle, box, blister pack, etc. In the case of consumer electronics, packaging the items may comprise packaging the item(s) for transit. These preparatory actions may take into account the type, size, or current capacity (e.g., amount of remaining cargo space, number of passengers, etc.) of the user's vehicle, which may have been conveyed to the merchant servers by the onboard computer of the user's vehicle. For instance, if the user has a pickup truck the preparatory actions may comprise wrapping the item(s) in plastic to protect them against the weather, or if the user has a sedan the preparatory actions may comprise cushioning the item(s) to be strapped to the user's vehicle or disassembling the item so that it will fit in the user's vehicle.

In some examples, some or all of the pre-purchased items may be manufactured or assembled after the user pre-purchases them and while the user is in transit. For instance, if a user purchases a bicycle, the merchant may assemble the bicycle upon receiving the user's pre-purchase request so that it is ready when the user arrives. As another example, upon receiving a user's pre-purchase request for a repair part, an appliance dealer or other merchant may manufacture the part using, for example, three dimensional (3D) printing, additive manufacturing, rapid prototyping, or the like.

The pre-purchased items can be held at a specific area within the retail location and released upon arrival and confirmation of the customer who pre-purchased the items. At or before the user's arrival, the merchant servers may communicate to the onboard computing device where the user's vehicle should park and/or where the pre-purchased items are being held at the retail location. For instance, the merchant servers may instruct the onboard computer of the user's autonomous vehicle to proceed to a particular location (e.g., parking space 4, loading dock 6, a coordinate location, etc.) to pick up the pre-purchased items.

Upon the user's arrival, the items may be automatically loaded into or onto the user's vehicle. In other examples, the merchant may offer to meet the user at a location along the user's route or at the user's destination (if other than the merchant's location) to provide the items.

These techniques also allow for confirmation of the customer via multiple factors, including geolocation information from the onboard computing device, a token (a numerical confirmation code, a password or passphrase, a machine readable code such as a bar code or quick response (QR) code, an image, or other digital token) delivered to the onboard computing device or another mobile device, a receipt or pre-purchase confirmation, and/or other information (e.g., physical or electronic identification card, photograph, biometric information, etc.). In some examples, a digital token may be required to be presented and verified at the pickup location, along with corresponding validated geolocation data from the onboard computing device prior to allowing a customer to retrieve their pre-purchased items. In other examples, a lower level of proof may be required to confirm the identity of the user. The level of proof required may depend, for example, on the value of the goods purchased. For example, a user pre-purchasing a cup of coffee (or other item(s) below a predetermined threshold value) may need only meet a single form of authentication, while a user purchasing a new television (or any other item(s) at or above the predetermined threshold) may be required to supply multiple forms of authentication.

In some examples, such as when the pre-purchased items comprise food at a restaurant, the merchant servers may coordinate the preparation of the food so that the food is ready (for dine in or take out) when the user's autonomous vehicle arrives at the restaurant. In such an example, the merchant servers may communicate with the user's onboard computing device to obtain an estimated time of arrival (ETA), number of passengers/diners, ages of passengers/diners, etc. In the case where the user plans to dine at the restaurant, the merchant servers may reserve a table for the user based on the number of passengers in the user's party, and may place the user's food order when the user's remaining time to the restaurant approximately matches an estimated time to prepare the user's food order. The merchant servers may continuously or periodically communicate with the user's onboard computing device during the user's trip to refine the ETA, to confirm the user's reservation, etc.

In some examples, the pre-purchase request constitutes a pre-order and the actual purchase transaction occurs when the user takes possession of the item (e.g., as evidenced by near-field communication or other point of sale terminal). In that case, ownership of the items does not transfer until the user' takes possession of the items.

Example System

Figure 4:
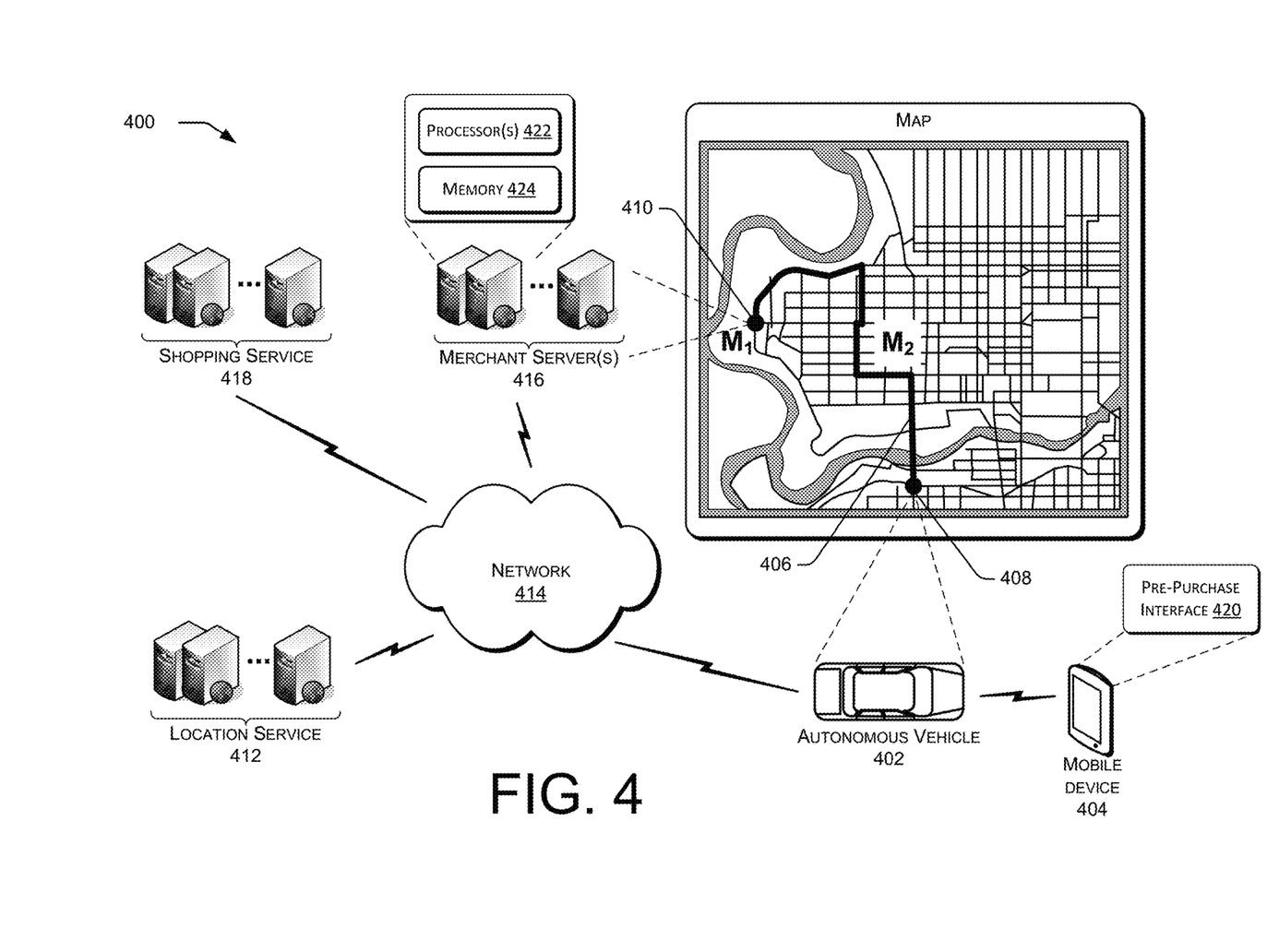
FIG. 4 is a schematic diagram illustrating an example system usable to facilitate operations between an onboard computing device of an autonomous vehicle and one or more merchant computing devices while the autonomous vehicle is traveling to the merchant or other destination.

FIG. 4 is a schematic diagram illustrating an example system 400 of computing devices usable to implement the pre-purchase mechanisms described herein. In this example, a user is in an autonomous vehicle 402. The user inputs a desired destination to which the user wishes to travel. In this example, the user inputs the name of a merchant ($M_1$). However, in other examples, the user may input the desired destination as an address, coordinates, general region (e.g., downtown, Seattle, etc.), a direction (e.g., North), the user may select a destination from a list of previous destinations or bookmarked destinations, or the user may select a destination from a map (e.g., by touching a desired destination on a map displayed on a touch screen display of the autonomous vehicle).

The user may input the desired destination via an interface of the autonomous vehicle 402, via a mobile device of the user 404, or via an interface of any other computing device onboard the vehicle. For instance, the user may select a desired destination from an address book, calendar application, mapping application, or other program stored in memory of the user's mobile device 404. This input may be transmitted from the mobile device 404 to the autonomous vehicle 402 via a wired (e.g., USB) or wireless (e.g., Bluetooth, Zigbee, WiFi, near field, cellular, etc.) connection. In this way, the user's mobile device (or any computing device in communication with the autonomous vehicle) may serve as an extension of a user interface of the autonomous vehicle 402 by communicating information to and/or from the autonomous vehicle 402. For convenience, the term "onboard computing device" is used hereinafter to refer to any one or combination of computing devices that are in or on an autonomous vehicle, including integral or imbedded systems of the autonomous vehicle (e.g., vehicle control system, navigation system, infotainment system, etc.) and mobile devices of one or more passengers of the autonomous vehicle.

The onboard computing device may determine a route 406 from a current location 408 of the autonomous vehicle 402 to the desired destination 410 ($M_1$ in this example). In some examples, the onboard computing device may determine the route 406 locally. However, in other examples, the onboard computing device may determine the route 406 by receiving map and/or routing data from a remote location service 412 via a network 414. Regardless of how the route 406 is determined, the autonomous vehicle 402 may begin traveling to the desired destination 410.

While the autonomous vehicle 402 is en route to the desired destination 410, the onboard computing device may obtain metadata including information about one or more items that are available for purchase from one or more merchants at or near the destination and/or along the route to the destination. For instance, in this example, the onboard computing device may obtain information about products available for purchase from merchant $M_1$ located at the desired destination 410 and merchant $M_2$ located near the route 406 to the desired destination. The metadata may also include other information about the merchants, such as hours of operation, a catalog of items for sale, inventory information, promotional offers, and the like. These and other examples of metadata can be found throughout the application. In some examples, the onboard computing device may obtain information about all items available from the merchants (e.g., a product catalog), while in some examples the onboard computing device may obtain information about only items the user has an explicit or implicit interest (e.g., based on a shopping list, prior purchase history, user search query, or the like). The onboard computing device may obtain the metadata from merchant servers (e.g., merchant servers 416) associated with the merchants at or near the destination 410 or along the route 406 and/or from a shopping service 418 that provides metadata for multiple merchants. In some examples, the metadata may include a pre-purchase interface 420 usable to purchase items from one or more merchants while the autonomous vehicle is en route to the desired destination 410. In other examples, the onboard computing device may generate the pre-purchase interface based on the received metadata.

Regardless of where the metadata comes from, the onboard computing device may cause the pre-purchase interface 420 to be presented on a display of the onboard computing device. By way of example and not limitation, the user may interact with the pre-purchase interface 420 as described with reference to FIGS. 1-3. In the illustrated example, the pre-purchase interface is caused to be presented on a display of the mobile device 404, though in other examples it may be presented on a display of the autonomous vehicle or any other computing device onboard the autonomous vehicle. In the illustrated example, merchant server(s) 416 of merchant $M_1$ transmit the pre-purchase interface 420 to the onboard computing device, including a list of items available for purchase from the merchant $M_1$. The merchant servers 416 may include one or more processors 422 and memory 424 storing data (e.g., item catalogs, promotional materials, advertisements, location data, etc.) and program modules including instructions that when executed configure the one or more processors 422 to perform the operations and functions described for the merchant servers.

Additionally or alternatively, the onboard computing device may also receive promotions or pre-purchase interfaces for items available for purchase from one or more other merchants (i.e., competitors) at or near the desired destination 410 and/or along the route 406. For instance, in this example, the onboard computing device may receive a promotion or pre-purchase interface from merchant $M_2$ located along the route 406. The promotion may include a message ("if you buy from us, you are already there") and/or discount ("buy from us and save 10%") to entice the user to pre-purchase items from the merchant $M_2$ instead of from merchant $M_1$, and thereby reroute to make a location of merchant $M_2$ the desired destination. In this example, the onboard computing device receives the promotional offer associated with merchant $M_2$ via the shopping service 418.

Figure 5:
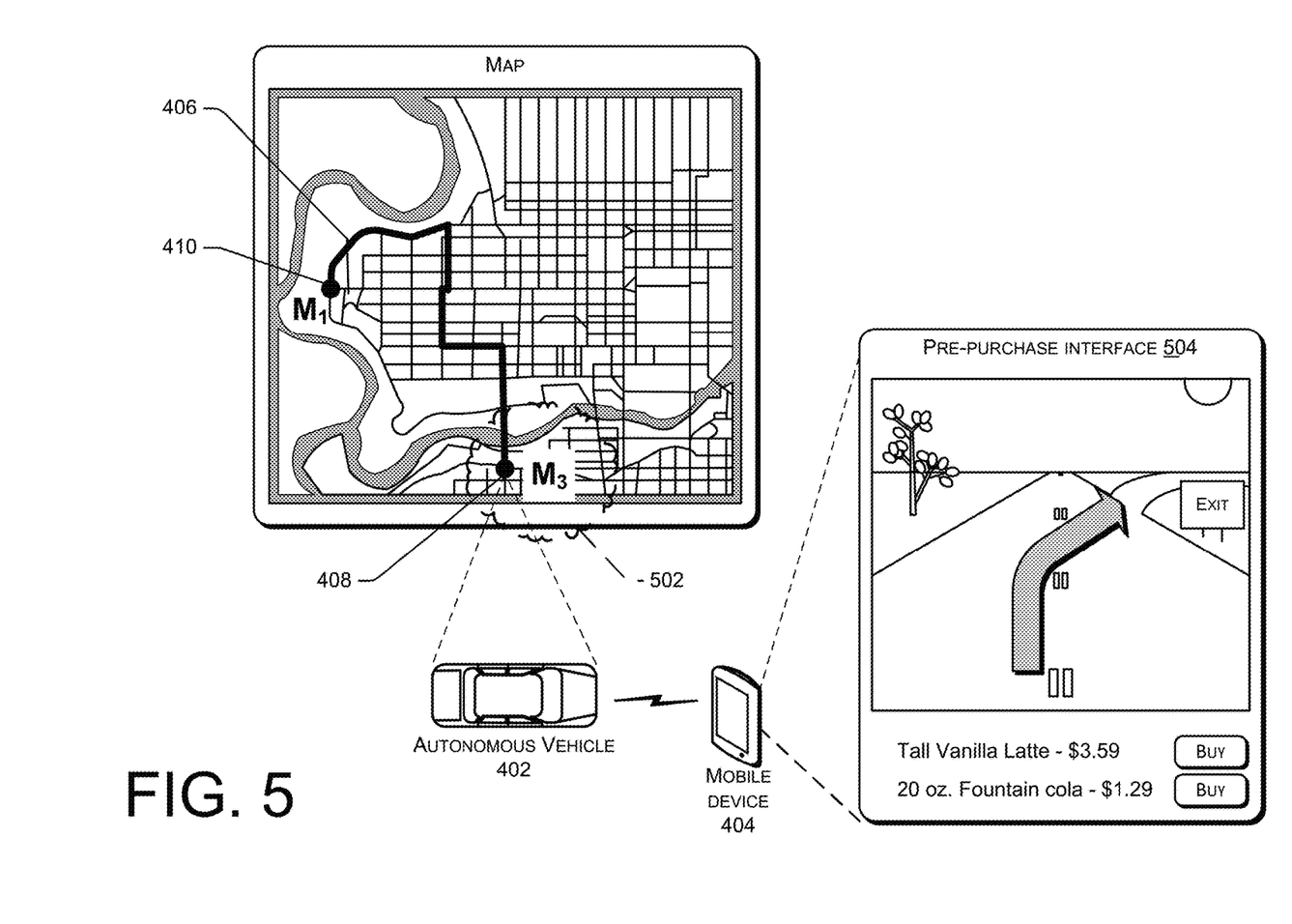
FIG. 5 is a schematic diagram illustrating an example pre-purchase scenario that may be implemented using the system of FIG. 4.

FIG. 5 is a schematic diagram illustrating another example pre-purchase scenario that may be implemented using the system 400 of FIG. 4. As shown in FIG. 5, the autonomous vehicle 402 is again traveling along a route 406 from a current location 408 to a desired destination 410. In this example, a merchant $M_3$ has subscribed to a shopping service, such as shopping service 418, and has set up a geo-fence 502. The geo-fence 502 bounds a geographical area (e.g., area on a map, proximity to a location, etc.) A location service, such as location service 416, notifies the shopping service when an onboard computing device enters the geo-fenced area 502. The shopping service may then send the onboard computing device metadata, such as a promotion or pre-purchase interface 504. The metadata may be pushed to the onboard computing device by the shopping service, or the onboard computing device may request the metadata from the shopping service. In some examples, every onboard computing device that enters the geo-fence 502 triggers the pre-purchase interface 504 to be sent. In other examples, however, the pre-purchase interface 504 is only sent when certain conditions are met. For instance, a user of the onboard computing device has an explicit or implicit interest in one or more items available for purchase from the merchant $M_3$, the user has previously purchased items from the merchant $M_3$ and a threshold time has passed since the last purchase, the user has a history of purchasing items from the merchant $M_3$, the merchant $M_3$ has an inventory of a certain item above a certain threshold, the merchant $M_3$ has an item that has a remaining shelf life below a threshold time, or the like.

In the illustrated example, the onboard computing device has entered the geo-fence 502 during regular hours of operation of merchant $M_3$ and has a history of purchasing items available from the merchant $M_3$. Thus, the onboard computing device is provided with a pre-purchase interface 504 that includes items that the user frequently purchases and that are available for purchase from the merchant $M_3$. The shopping generate the pre-purchase interface 504 based on correlations between the user's purchase history and a catalog of items available for purchase from the merchant $M_3$. If the user selects one of the "buy" buttons on the pre-purchase interface, the onboard computing device may reroute the autonomous vehicle to a new desired destination (e.g., the location of merchant $M_3$), or may alter the route to detour past the location of the merchant $M_3$ to pick up the pre-purchased items. The onboard computing device may change the destination and/or alter the route based on location data of the merchant $M_3$ specified in the pre-purchase interface 504 or otherwise communicated by the shopping service, location service, or merchant servers of merchant $M_3$. Once the user selects to pre-purchase an item, the merchant $M_3$ receives a pre-purchase request for the item(s). The merchant $M_3$ can then prepare the item(s) so that they are ready when the user arrives at a location of the merchant $M_3$. In this way, a user's coffee may be ready and waiting for her when she arrives at the merchant $M_3$.

Example Onboard Computing Device

Figure 6:
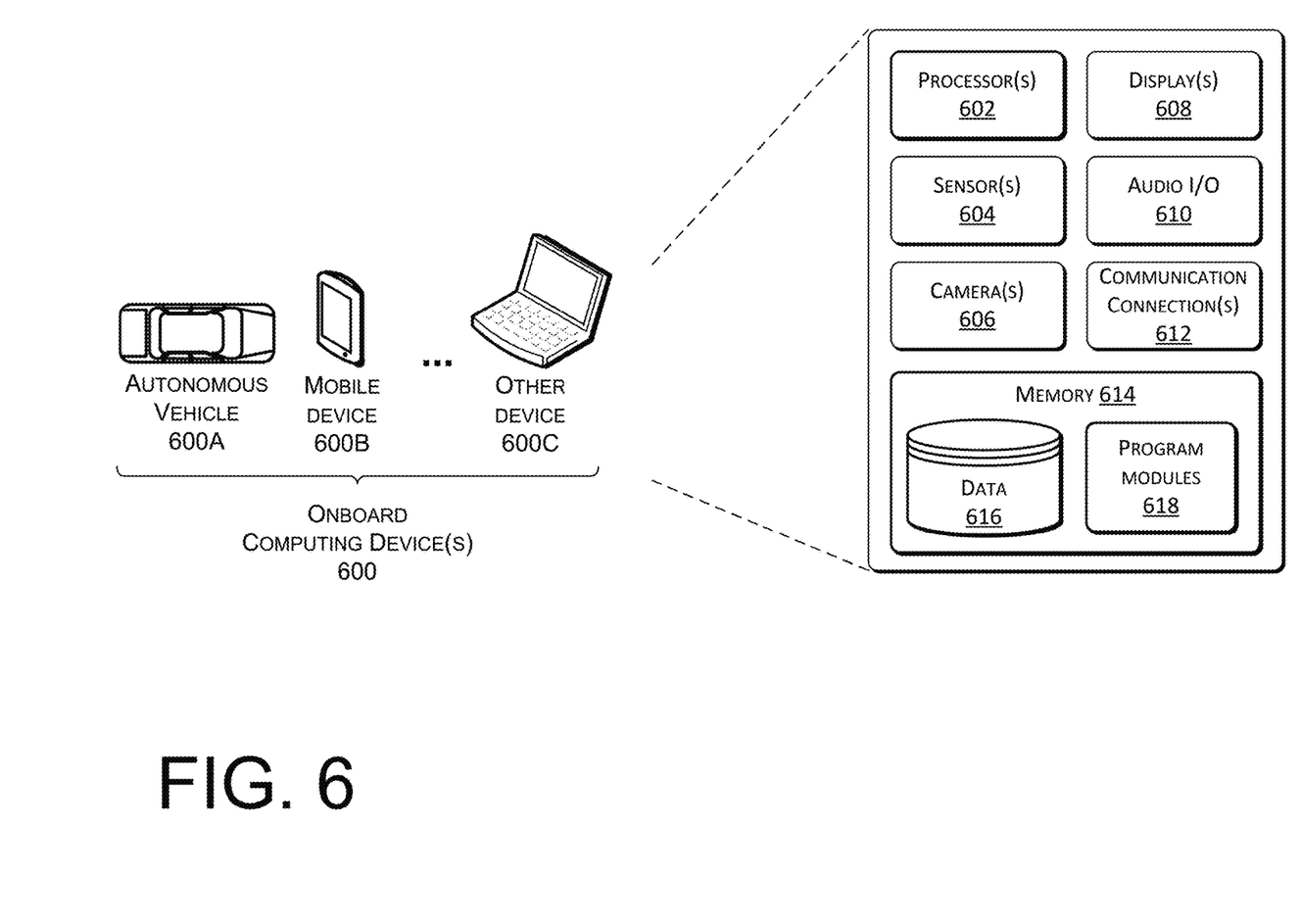
FIG. 6 is a block diagram illustrating an example onboard computing device of an autonomous vehicle usable with the system of FIG. 5.

FIG. 6 is a block diagram of illustrating logical components (e.g., software and hardware) of example onboard computing devices 600. The onboard computing devices 600 may be a computing device or system of an autonomous vehicle 600A, a mobile device 600B of a passenger in the autonomous vehicle, any other computing device 600C in or on the autonomous vehicle, or a combination of any the foregoing. Onboard computing devices 600A, 600B, and 600C are representative onboard computing devices 600.

The onboard computing device(s) according to this disclosure may include any hardware and/or software components typically included in such devices. In the example of FIG. 6, the onboard computing device 600 includes one or more processors 602 communicatively coupled to one or more sensors 604, one or more cameras 606, one or more displays 608, one or more audio inputs and/or outputs 610, one or more communication connections 612, memory 614, and other components (e.g., battery, drive train, etc.).

The sensors 604 may include inertial sensors (e.g., accelerometers, gyroscopes, etc.), proximity sensors, motion sensors, touch sensors, navigation sensors (e.g., compass, global positioning satellite system, etc.), or the like. The sensors 604 may be used as inputs to an autonomous vehicle control system. Further, though they are shown as separate blocks in this figure, the camera(s) 606, display(s) 608 (in the case of touch screen displays), audio input(s) 610, and communication connection(s) 612 of the onboard computing device are also examples of sensors.

The camera(s) 606 may include one or more exterior cameras (e.g., backup camera, blind spot cameras, front facing cameras, side facing cameras, fish eye cameras, etc.) and/or one or more interior cameras (e.g., passenger or driver facing cameras). The exterior cameras may be used by the autonomous vehicle to identify objects and other vehicles around the autonomous vehicle. The exterior cameras may also be used for semi-autonomous purposes such as for adaptive cruise control and to provide a driver (when not in autonomous mode) with views of one or more blind spots.

The display(s) 608 may comprise, one or more of a liquid crystal display (LCD), a light emitting diode display (LED), a plasma display, a head up display, a cathode ray tube (CRT) display, a combination of any of the foregoing, or other display technologies. In some examples, some or all of the display(s) 608 may comprise touch screen displays capable of receiving input by touching the screen with a finger, hand, thumb, stylus, or other pointing device.

The audio inputs and/or outputs 610 may include one or more audio inputs (e.g., microphones, audio-in jacks, etc.) and/or one or more audio outputs (e.g., speakers, headphone jack, etc.). The audio inputs may be used to receive voice inputs (e.g., inputs of destinations, pre-purchase requests, etc.), for example, while the audio outputs may be used to make audible announcements (e.g., audible pre-purchase offers).

Communication connection(s) 612 include one or more wired or wireless transceivers to allow the onboard computing device to communicate with one or more other computing devices. The communication connection(s) 612 may include wide area communication connections such as cellular data and/or voice connections, satellite communications, or the like. The communication connection(s) 612 may also include other wireless communication modules (e.g., WiFi, Bluetooth, Zigbee, other radio frequency communications, etc.) and/or wired communication connections, such as universal serial bus (USB, Ethernet, firewire, etc.) for communication with other nearby computing devices. Also, the communication connection(s) 612 may be used by a computing device of an autonomous vehicle to communicate with other computing devices, such as mobile devices of passengers in the autonomous vehicle.

Memory 614 may store data 616 such as map data (e.g., maps, navigation history, bookmarks, favorite locations, waypoints, etc.), user preference data (e.g., user purchase history, vehicle seat and mirror placements, etc.), entertainment data (e.g., radio station presets, audio content, video content, etc.), user profile data (e.g., account information, login credentials, passwords, payment instruments, etc.), usage data (e.g., search history, browser history, etc.), and the like.

Memory also includes one or more applications or program modules 618 to implement various operations. For instance, the memory 614 may include a camera module to control operation of the camera(s) 606, a media player to playback content stored in the data 616, a navigation module to calculate routes to destinations, an autonomous driving module to control drive systems of an autonomous vehicle, a pre-purchase or shopping interface module to communicate with one or more merchant computing devices and/or shopping services, and the like.

Memory 614 is shown to include software functionality configured as one or more applications or "modules." However, the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

The program modules 618 may include instructions executable by the one or more processors 602 to implement the functionalities they are described as performing. The onboard computing device may additionally or alternatively include one or more hardware components (e.g., application specific integrated circuits, field programmable gate arrays, systems on a chip, and the like) to implement some or all of the functionalities the modules are described as performing.

The memory 424 and the memory 614 described herein are examples of computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media, such as modulated data signals and carrier waves.

CONCLUSION

While various examples and embodiments are described individually herein, the examples and embodiments may be combined, rearranged and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. An autonomous vehicle comprising:
a user interface comprising an input and an output;
a navigation system;
one or more communication connections; and
an onboard computer communicatively coupled to the user interface and the navigation system, the onboard computer having one or more processors and memory, the memory storing executable instructions that, when executed configure the one or more processors to perform operations comprising:
receiving input of a destination via the input of the user interface;
determining a route to the destination using the navigation system;
driving the autonomous vehicle along the route toward the destination autonomously;
retrieving, via the one or more communication connections, information regarding one or more items available for pre-purchase from a merchant at or proximate the destination; and
presenting a prompt via the output of the user interface, the prompt identifying the one or more items available for pre-purchase from the merchant prior to the autonomous vehicle arriving at the destination, wherein the one or more items comprises a part to be manufactured by three-dimensional printing after pre-purchase of the item and while the autonomous vehicle is in transit.

2. The autonomous vehicle of claim 1, the operations further comprising:
receiving, via the input of the user interface, a selection of at least one of the one or more items identified in the prompt, wherein the selection comprises the part to be manufactured by three-dimensional printing; and
responsive to receiving the selection, transmitting a pre-purchase request to a computing device of the merchant via the one or more communication connections prior to arriving at the destination.

3. The autonomous vehicle of claim 2, wherein:
the user interface comprises a touch screen display,
presenting the prompt comprises displaying on the touch screen display a list of the one or more items available for pre-purchase from the merchant, and
receiving the selection to pre-purchase the at least one of the one or more items comprises receiving a touch input selecting the at least one of the one or more items available for purchase from the list of the one or more items on the touch screen display.

4. The autonomous vehicle of claim 2, wherein:
the user interface comprises a microphone as the input and a speaker as the output,
presenting the prompt comprises audibly announcing, via the speaker, a list of the one or more items available for pre-purchase from the merchant, and
receiving the selection to pre-purchase the at least one of the one or more items comprises receiving a voice input, via the microphone, selecting the at least one of the one or more items available for purchase from the announced list of the one or more items.

5. The autonomous vehicle of claim 1, the operations further comprising:
receiving, via the one or more communication connections, a promotion from another merchant within a predetermined distance of the route, the promotion offering to sell at least one of the one or more items identified in the prompt;
presenting a second prompt via the output of the user interface, the second prompt including the promotion offering to sell at least one of the one or more items;
receiving, via the input of the user interface, a selection of the at least one of the one or more items identified in the promotion; and responsive to receiving the selection, transmitting a pre-purchase request to a computing device of the other merchant via the one or more communication connections; and
changing the destination to a location of the other merchant.

6. An autonomous vehicle comprising:
a user interface comprising an input and an output;
a navigation system;
one or more communication connections; and
an onboard computer communicatively coupled to the user interface and the navigation system, the onboard computer having one or more processors and memory, the memory storing executable instructions that, when executed configure the one or more processors to perform operations comprising:
sending a communication from an onboard computing device of an autonomous vehicle indicating that the onboard computing device is en route to a destination within a predetermined proximity of a location of a merchant;
obtain information about one or more items available for purchase from the merchant to offer to a user of the onboard computing device of the autonomous vehicle;
receiving a pre-purchase communication sent to the onboard computing device of the autonomous vehicle offering the one or more items for purchase prior to the onboard computing device arriving at the destination, the pre-purchase communication comprising a control usable to pre-purchase the items from the merchant;
sending a pre-purchase request indicating selection of the pre-purchase communication and identifying one or more pre-purchased items;
receiving notification of a location at which the autonomous vehicle should park at the location of the merchant; and
providing geolocation information from the onboard computing device to confirm an identity of the user to retrieve the one or more pre-purchased items.

7. The autonomous vehicle of claim 6, wherein the destination comprises a location other than the location of the merchant.

8. The autonomous vehicle of claim 6, the operations further comprising:
providing a payment instrument associated with the user for the one or more pre-purchased items.

9. The autonomous vehicle of claim 8, further comprising:
receiving a pre-purchase confirmation to the onboard computing device of the autonomous vehicle, the pre-purchase confirmation comprising a token; and
providing confirmation of an identity of the user prior to receiving the one or more pre-purchased items to the user, the confirming of the identity of the user being based on multiple authentication factors, including:
the geolocation information from the onboard computing device at the destination; and
the token of the pre-purchase confirmation.

10. The autonomous vehicle of claim 6, the operations further comprising receiving the one or more pre-purchased items to be conveyed to the user upon arrival of the user at the location of the merchant.

11. The autonomous vehicle of claim 6, wherein the onboard computing device of the user comprises an integrated computing device of the autonomous vehicle or a mobile device that is onboard the autonomous vehicle and in communication with the autonomous vehicle.

12. An autonomous vehicle comprising:
a user interface comprising an input and an output;
a navigation system;
one or more communication connections; and
an onboard computer communicatively coupled to the user interface and the navigation system, the onboard computer having one or more processors and memory, the memory storing executable instructions that, when executed configure the one or more processors to perform operations comprising:
receiving input indicating a desired destination;
transmitting the desired destination to one or more computing devices;
receiving content including one or more items available for pre-purchase from one or more merchants while the autonomous vehicle is en route to, and prior to arrival at, the desired destination, wherein the one or more items comprise food from a restaurant to be prepared to be available when the autonomous vehicle arrives at the restaurant, and wherein the autonomous vehicle has an estimated time of arrival (ETA) based on calculations performed by the onboard computer; and
transmitting a request to pre-purchase the food, the request being transmitted at a time based at least in part on the ETA and an estimated time to prepare the food.

13. The autonomous vehicle of claim 12, wherein the one or more items available for pre-purchase are available from a merchant associated with the desired destination.

14. The autonomous vehicle of claim 13, further comprising:
receiving input requesting to pre-purchase additional items; and
transmitting a request to pre-purchase the additional items.

15. The autonomous vehicle of claim 14, wherein transmitting the request comprises transmitting the request to a merchant associated with the desired destination.

16. The autonomous vehicle of claim 14, wherein transmitting the request comprises transmitting the request to a competitor of a merchant associated with the desired destination,
the operations further comprising changing the desired destination to be a location of the competitor.

17. The autonomous vehicle of claim 12, wherein the one or more items available for pre-purchase are available from a competitor of a merchant associated with the desired destination, wherein the competitor is at location different than the desired destination.

18. The autonomous vehicle of claim 12, wherein the one or more computing devices comprise one or more servers of a merchant associated with the desired destination.

19. The autonomous vehicle of claim 12, wherein the one or more computing devices comprise one or more servers of a location service.

20. The autonomous vehicle of claim 12, wherein the ETA is refined while the autonomous vehicle is en route, and wherein the refined ETA is transmitted to at least one computing device of the restaurant.

* * * * *